(12) United States Patent
Ulicny et al.

(10) Patent No.: US 7,878,387 B2
(45) Date of Patent: Feb. 1, 2011

(54) MAGNETIC PARTICLE CONTAINING MATERIAL FOR FASTENING TOGETHER PARTS OR SUBSTRATES

(75) Inventors: John C. Ulicny, Oxford, MI (US); Paul E. Krajewski, Troy, MI (US); Mark A. Golden, Washington, MI (US); Keith S. Snavely, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/436,851

(22) Filed: May 7, 2009

(65) Prior Publication Data

US 2010/0282823 A1 Nov. 11, 2010

(51) Int. Cl.
*B21K 31/02* (2006.01)
(52) U.S. Cl. ............... 228/256; 228/246; 228/248.1
(58) Field of Classification Search .......... 228/256, 228/245, 246, 248.1, 248.5, 253, 254, 56.3; 428/614, 545; 438/613
See application file for complete search history.

(56) References Cited

U.S. PATENT DOCUMENTS

| | | | |
|---|---|---|---|
| 5,093,545 A * | 3/1992 | McGaffigan | 219/616 |
| 5,346,775 A * | 9/1994 | Jin et al. | 428/614 |
| 5,769,996 A * | 6/1998 | McArdle et al. | 156/272.4 |
| 5,780,536 A * | 7/1998 | Yokoyama et al. | 524/439 |
| 6,054,761 A * | 4/2000 | McCormack et al. | 257/698 |
| 6,709,966 B1 * | 3/2004 | Hisatsune et al. | 438/613 |
| 6,709,996 B2 | 3/2004 | Mleziva et al. | |
| 2006/0251754 A1 * | 11/2006 | Herring | 425/3 |

* cited by examiner

*Primary Examiner*—Roy King
*Assistant Examiner*—Michael Aboagye
(74) *Attorney, Agent, or Firm*—Reising Ethington P.C.

(57) ABSTRACT

In one exemplary embodiment, a high melting temperature fastening material may be prepared containing magnetic particles that is used to fasten two or more parts substrates together to form an integrated part.

20 Claims, 3 Drawing Sheets

MAGNETIC PARTICLE CONTAINING MATERIAL FOR FASTENING TOGETHER PARTS OR SUBSTRATES

TECHNICAL FIELD

The field to which the disclosure generally relates to magnetic particle containing materials that may be used to fasten together substrates.

BACKGROUND

Soldering is a process in which two or more metal substrates are joined together by melting and flowing a filler metal into the joint, the filler metal having a relatively low melting point. In a conventional soldering process, heat is applied to the substrates to be joined, causing the solder to melt and be drawn into the joint by capillary action and to bond to the substrates to be joined by wetting action. A solder flux agent or material is typically used to assist the flow of the solder into the desired location.

Metal substrates may alternatively be joined together using polymeric adhesive materials. Conventionally, this is done by applying the adhesive between the metal substrates. The substrates may also be fastened in a similar manner to a conventional soldering process.

SUMMARY OF EXEMPLARY EMBODIMENTS OF THE INVENTION

In one exemplary embodiment, a high melting temperature fastening material may be prepared containing magnetic particles that is used to fasten two or more substrates together to form an integrated part. The magnetic particles in the fastening material may allow a molten mixture of the fastening material to be drawn to a desired location through use of a magnet, electromagnet or magnetic field.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Referring now to FIGS. 1-4, one exemplary method for fastening together two distinct parts or substrates 12, 14 to form an integrated part 10 may be depicted. Although two substrates are shown in FIGS. 1-4, the use of a solder including magnetic particles may be used to fasten two parts together such as, but not limited to, an electronic component and a circuit board. In one embodiment, the solder composition is free, or substantially free, of a flux agent.

Figure 1:
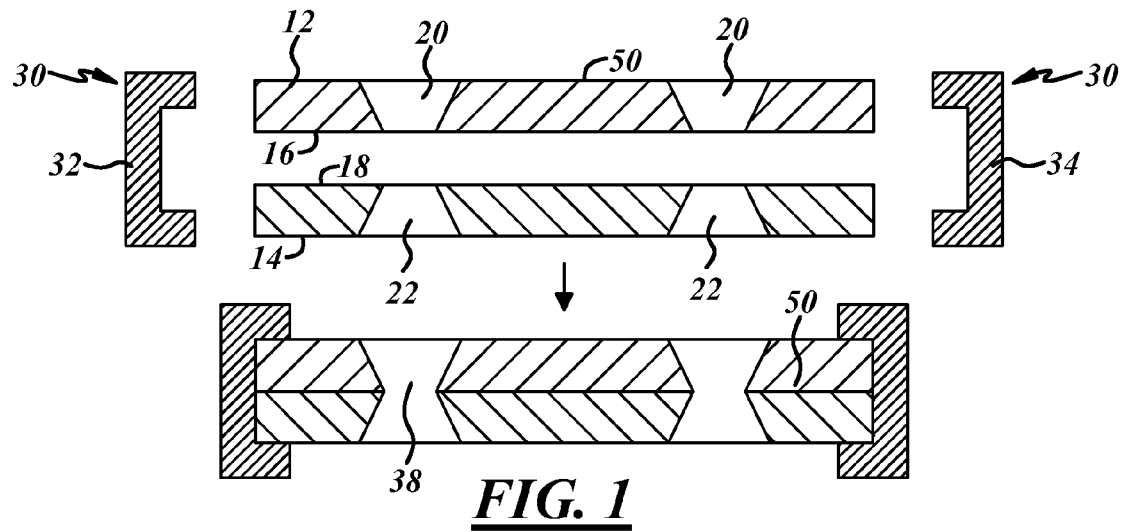
FIG. 1 is a schematic perspective partial section view of a method for coupling a pair of substrates in a clamping device.

In one embodiment, as shown first in FIG. 1, two substrates 12, 14 may first be aligned such that their respective mating surfaces 16, 18 are mated and such that through holes 20, 22 are aligned as desired. A clamping device 30 having a right half 32 and left half 34 may then be positioned on either side of the substrates 12, 14 and acts to clamps the substrates 12, 14 to form a coupled substrate 50 such that the mating surfaces 16, 18 are in contact with one another wherein the holes 20, 22 form a continuous cavity or cavities 38.

Figure 2:
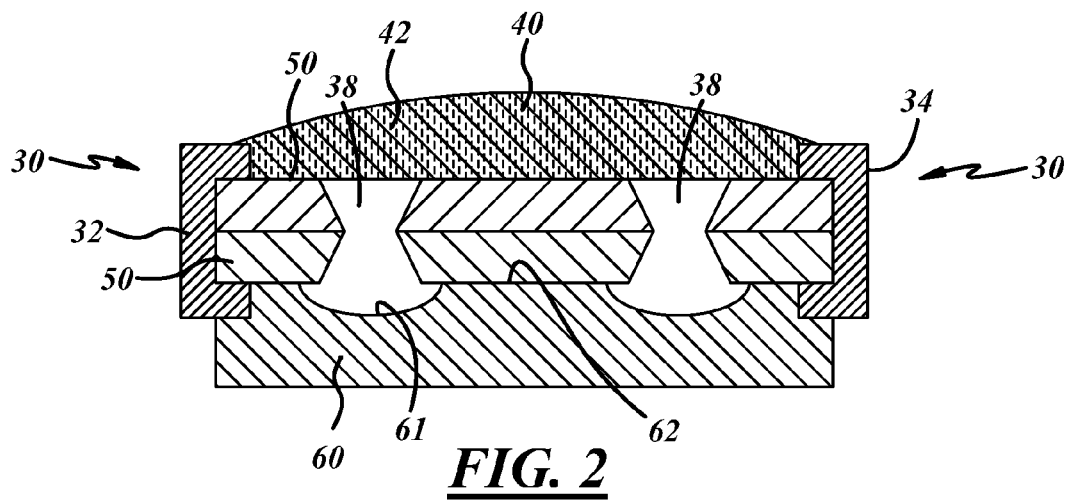
FIG. 2 illustrates the coupling of a magnetic mold base to the bottom of the coupled substrates contained in the clamping device of FIG. 1 and the addition of high temperature fastening material having magnetic particles according to an exemplary embodiment of the present invention.
Figure 3:
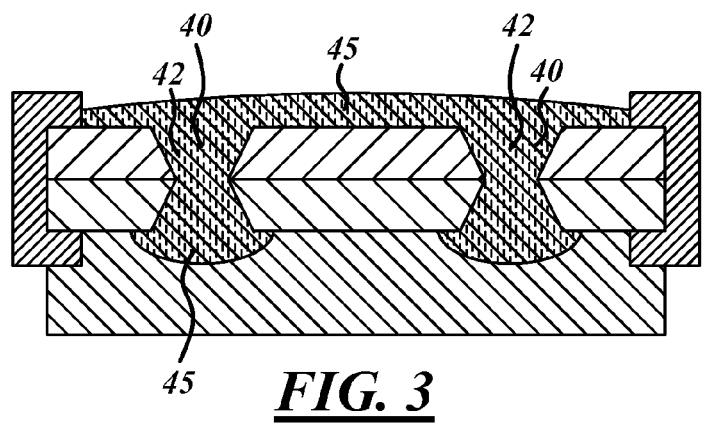
FIG. 3 illustrates a method for drawing the high temperature fastening materials within the adjacent holes in the pair of substrates in FIG. 2 to form an integrated part.

As shown in FIGS. 2 and 3, the coupled substrates 50 may then be placed onto a magnetic mold base 60. In this arrangement, the left half 34 of the clamping device 30 may be in close contact with a respective top surface 62 of the magnetic mold base 60. The magnetic mold base 60 may include depressed areas 61 corresponding to the continuous cavity 38.

A fastening material 40 in a molten or liquid state containing magnetic particles 42 may then be introduced onto a non-mated surface 50 of the substrate 12 opposite the magnetic mold base 60. As best shown in FIG. 3, the magnetic particles 42 in the molten material 40 aid in drawing the material 40 through the holes 20, 22 and into the depressions 61, therein filling the respective cavities 38. Once the molten material 40 fills the cavity 38 and depressions, it is allowed to cool and harden, therein reversibly coupling the substrates 12, 14 to form an integrated part 10.

The drawing rate of the molten material 40 towards the magnetic mold base 60 is a function of the size of the cavities 38, the viscosity of the molten material 40, the force of gravity and the strength of the magnetic field created by the magnetic mold base 60.

Figure 4:
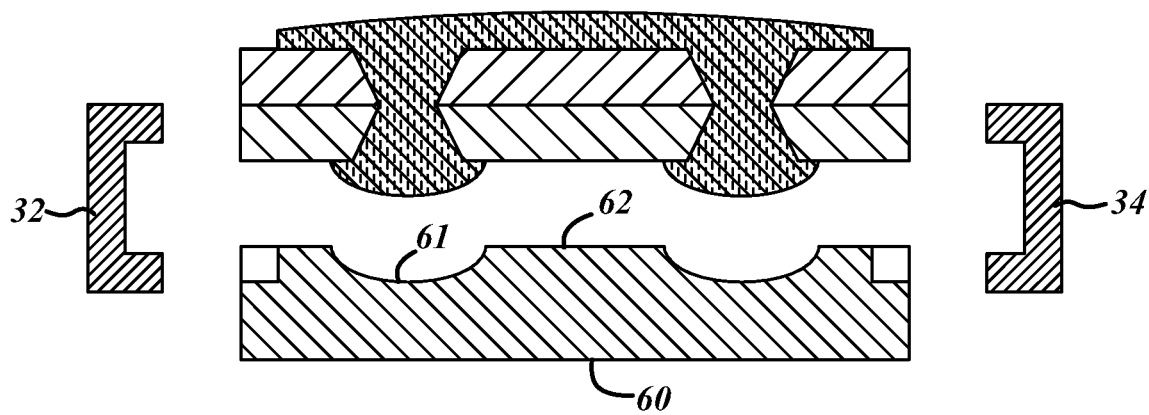
FIG. 4 illustrates the removal of the integrated part of FIG. 3.
Figure 5:
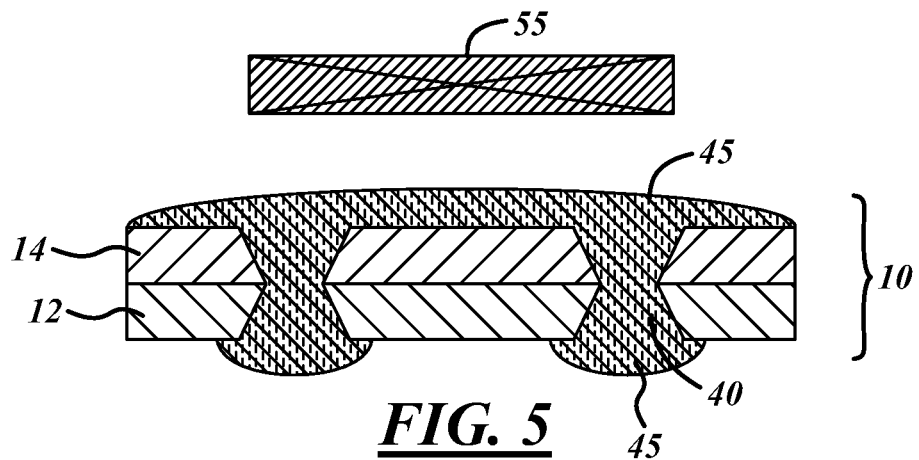
FIG. 5 illustrates an alternative arrangement for forming an integrated part according to another exemplary embodiment.

At this point, as shown in FIG. 4, the clamping device 30 and mold base 60 may be removed. Excess fastening material 45 not contained within the cavities 38 that has settled into the depressions 61 or remained on the non-mated surface 50 may be recovered through use of an external magnet 55 and recycled as shown best in FIG. 5. The external magnet 55 may be a permanent magnet or an electromagnet.

Figure 6:
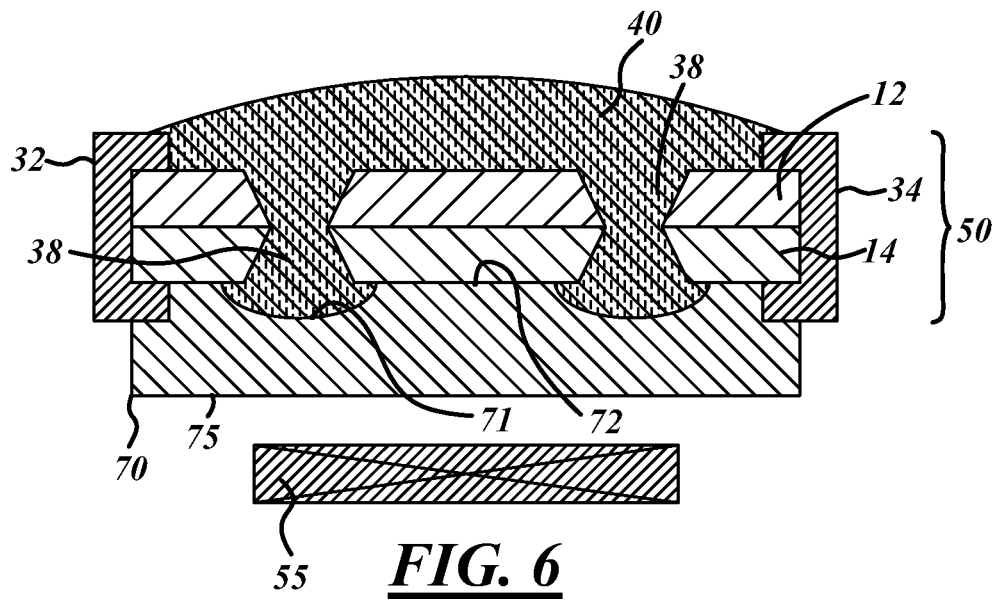
FIG. 6 illustrates a schematic perspective view for recovering excess high temperature fastening materials used in for forming an integrated part as in FIGS. 1-4.

In an alternative exemplary arrangement to the arrangement as shown in FIG. 3, as shown in FIG. 6, the mold base 70 is not a magnetic mold base 60, but instead may be formed of any non-magnetized material. The mold base includes depressions 71 along a top surface 72 similar to depressions 61 as described above. In this exemplary embodiment, a magnet 55 may be brought in close proximity to the bottom surface 75 of the mold base 70 in order to draw the fastening material 40 through the holes 20, 22 as described above. The magnet 55, whether a permanent magnet or electromagnet, may then be removed after the fastening material 40 is sufficiently drawn through the holes 20, 22 and cooled. Alternatively, a magnetic field may be created by a coil or other means to cause the solder including magnetic particles to flow to a desired location.

Figure 7:
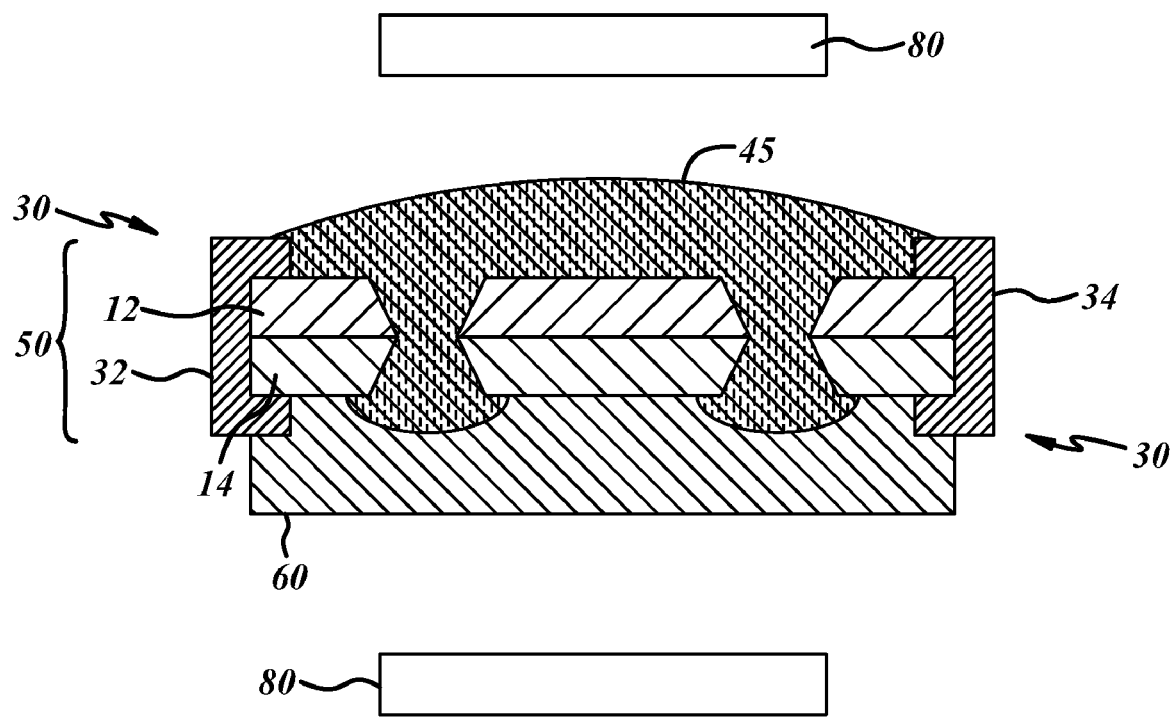
FIG. 7 illustrates another exemplary alternative arrangement for forming the integrated as in FIGS. 1-4.

In still another alternative exemplary arrangement to supplement the introduction of the fastening material 40 as in FIG. 3, as shown in FIG. 7, a heater 80 may be placed in close proximity to the magnetic mold base 60 and non-mated surface 50. The heater 80, whether an induction heater or a radiant heater, may aid in maintaining the fastening material 40 in a molten or liquid state as it is drawn through the holes 20, 22 towards the magnetic mold base 60. In addition, the presence of the magnetic particles 42 in the solder may facilitate the original heating of the fastening material 40 from a solid state to the molten state.

Figure 8:
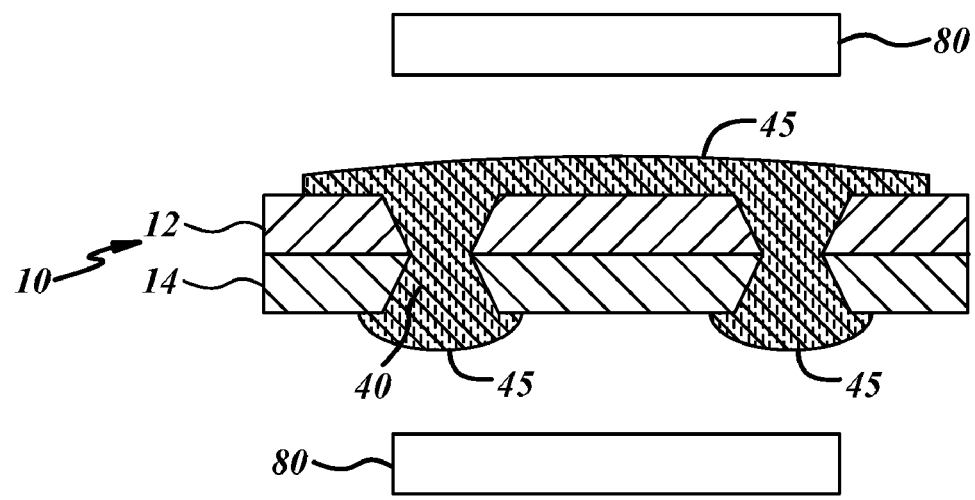
FIG. 8 illustrates another exemplary alternative arrangement for recovering excess high temperature fastening material used in forming an integrated part as in FIGS. 1-4.

In yet another alternative exemplary arrangement to FIG. 4, as shown in FIG. 8, a heater 80 such as the heater 80 from FIG. 6 may be placed in close proximity to the integrated part 10 to remove any excess fastening material 45. The heater 80 may act to melt the excess fastening material 45 back to a molten state, wherein it can easily be scraped or otherwise removed from any surface of the integrated part 10 as described above.

In one exemplary embodiment for any of the exemplary embodiments of FIGS. 1-8 above, the fastening material 40 may be a high melting temperature solder alloy of bismuth, indium, and/or tin containing magnetic particles that is coupled to a substrate material that forms the outer surfaces of the substrates 12, 14. The substrate materials 12, 14 may include any material to which solder may be applied, including but not limited to metal substrate materials such as copper or steel. If permanently magnetizable particles are used as the magnetic particles 42, the flux density of the magnetic field used during the process will determine, in part, the ultimate shear strength of the bond between the substrates 12, 14 created by the fastening material 40 located within the cavities 38. A shear strength enhancement may also occur if "soft" magnetic particles, as opposed to permanent magnetic particles, are used if the liquid portion of the solder or adhesive solidifies while the magnetic field is applied.

Exemplary alloys of bismuth, indium, and/or tin that may be utilized in the high temperature alloy fastening material 40 include Indalloy 174, Indalloy 162, and Indalloy 19, each having compositions described below in Table 1 (percentages are weight percents):

TABLE 1

| Indalloy # | % Bismuth | % Indium | % Tin | Melting Point (Degrees Celsius) |
|---|---|---|---|---|
| 174 | 56.3 | 26.5 | 17.3 | 79 |
| 162 | 33.8 | 66.2 | 0 | 72 |
| 19 | 50.9 | 32.5 | 16.70 | 60 |

Exemplary magnetic materials 42 that may be used with the exemplary alloys include iron powders (I.P.) such as CM (average particle size 8 micron) or HS (average particle size 2 micron), or combinations thereof, both supplied by BASF Corp. of Mt. Olive, N.J. These exemplary magnetic materials 42 may be surface treated with phenyl phosphonic acid (PPA), 14MAG124 (a magnetorheological fluid) or with silica ($SiO_2$) to reduce oxidation at elevated temperatures. These magnetic materials 42 may be washed with solvents prior to introduction to the material 40 to remove residual oils from the iron powders.

Exemplary formulations of fastening materials 40 including one of the high temperature alloys of Table 1 with the exemplary magnetic materials 42 which were hand mixed with a spatula for a predetermined amount of time. These exemplary formulation are provided in Table 2:

TABLE 2

| Ingredients | Percent by Wt. | Mix Temp. | Mix Method | Mix Time | Results | After 5 days At 100 C. |
|---|---|---|---|---|---|---|
| Alloy 174 50/50 (CM/HS) I.P | 53% 47% | 100 C. | heated mortar spatula twice | 10 Min | Dry Paste | Dry soft Paste |
| Alloy 174 50/50 (CM/HS) I.P. | 64% 36% | 100 C. | heated mortar spatula twice | 10 Min | Good Mix Soft Past | Soft Paste |
| Alloy 162 50/50 (CM/HS) I.P | 64% 36% | 100 C. | heated mortar spatula twice | 10 Min | Very Good Mix | Soft Paste |
| Alloy 19 50/50 (CM/HS) I.P | 64% 35% | 100 C. | heated mortar spatula twice | 10 Min | Drier Mix Soft Paste | Drier Soft Paste |
| Alloy 174 PPA Coated HS I.P. | 64% 36% | 100 C. | heated mortar spatula twice | 10 Min | Difficult Mix Dry Paste | Much drier Paste |
| Alloy 162 PPA Coated HS I.P. | 64% 36% | 100 C. | heated mortar spatula twice | 10 Min | Difficult Mix Dry Paste | Much drier Paste |
| Alloy 162 14MAG124 HS I.P. | 64% 36% | 100 C. | heated mortar spatula twice | 10 Min | Very fast Wetting Soft Paste | Soft Paste |
| Alloy 162 50/50 HS/CM I.P | 64% 36% | 100 C. | heated mortar spatula twice | 10 Min | Very fast Wetting Soft paste | Soft Paste |

In another exemplary formulation for the fastening material 40, the fastening material 40 may be a high melting temperature polymeric material containing the afore-mentioned magnetic particles 42. Exemplary thermoplastic polymers that may be utilized include nylon, polypropylene, polystyrene, or polyethylene.

The method for bonding together the substrates 12, 14 to form an integrated part 10, as shown in FIGS. 1-7 and described above, is equally appropriate for use with the high melting temperature polymeric material containing the afore-mentioned magnetic particles 42 as with the high temperature metal solder including the magnetic particles 42 and will not be repeated herein.

This bonding method of the exemplary embodiments provides a number of benefits. For example, pieces of either similar or dissimilar substrates can be fastened together quickly and easily. Also, multiple fastening operations can be performed at one time. Further, either temporary or permanent fasteners can be installed using the same exemplary method. Also, bonds of varying strength may be realized through the use of different integrated part 10 materials, different sized holes, and differing magnetic flux density. Finally, the fastening process can be readily reversed by heating of the fastening material 40 above its melting point and applying a magnet to remove the molten fastening material.

The above description of embodiments of the invention is merely exemplary in nature and, thus, variations thereof are not to be regarded as a departure from the spirit and scope of the invention.

In select exemplary embodiments the magnetic particles in the solder composition may be present in an amount ranging from about 0.01-50 weight (wt.) percent; about 1-10 wt. percent; about 2-6 wt. percent or about 3-20 wt. percent.

What is claimed is:

1. A method comprising:
   providing a first substrate having at least one hole extending through said first substrate;
   providing a second substrate having at least one hole extending through said second substrate;
   aligning said at least one hole of said first substrate with a respective one of said at least one hole of said second substrate;
   drawing a fastening material in a molten state into said at least one hole extending through said first substrate and into said at least one hole extending through said second substrate using a magnetic field to provide coupled substrates to provide coupled substrates; and
   cooling said fastening material from said molten state to a solid state to transform said coupled substrates to an integrated part.

2. The method of claim 1, wherein said fastening material comprises a plurality of magnetic particles and a high melting temperature alloy of bismuth and indium.

3. The method of claim 1, wherein said fastening material comprises a plurality of magnetic particles and a high melting temperature alloy of bismuth and indium and tin.

4. The method of claim 1, wherein said fastening material comprises a plurality of magnetic particles and a high melting temperature polymeric material.

5. The method of claim 1 further comprising:
   removing any excess fastener material not contained within said at least one hole extending through said first substrate or within said at last one hole extending through said second substrate.

6. The method of claim 5, wherein removing any excess fastener material comprises:
   introducing a magnet in close proximity to said integrated part to recover any excess fastener material.

7. The method of claim 5, wherein removing any excess fastener material comprises:
   introducing a heater in close proximity to said integrated part to melt any excess fastener material; and
   introducing a magnet in close proximity to said melted excess fastener material to recover said melted excess fastener material.

8. The method of claim 1, further comprising providing a magnetic base underneath said first and said second substrates wherein said magnetic base includes at least one depression respectively coupled to a corresponding one of said at least one hole in said second substrate, each of said at least one depression being used to collect any excess molten fastener material drawn through said respective one of said at least one hole in said second substrate.

9. The method of claim 1, wherein the composition of said first substrate is different than said second substrate.

10. The method of claim 1, wherein said first substrate comprises a metal substrate.

11. A method comprising:
    providing a first substrate having at least one hole extending through said first substrate;
    providing a second substrate having at least one hole extending through said second substrate;
    aligning at least one hole of said first substrate with a respective one of said at least one hole of said second substrate;
    coupling a mold base in close proximity to said second substrate;
    coupling a magnet in close proximity to said mold base;
    drawing a fastening material in a molten state into said at least one hole extending through said first substrate and into at least one hole extending through said second substrate using a magnetic field to provide coupled substrates; and
    cooling said fastening material from said molten state to a solid state to transform said coupled substrates to an integrated part.

12. The method of claim 11, wherein said fastening material comprises a plurality of magnetic particles and a high melting temperature alloy of bismuth and indium.

13. The method of claim 11, wherein said fastening material comprises a plurality of magnetic particles and a high melting temperature alloy of bismuth and indium and tin.

14. The method of claim 11, wherein said fastening material comprises a plurality of magnetic particles and a high melting temperature polymeric material.

15. The method of claim 11 further comprising:
    removing any excess fastener material not contained within at least one hole extending through said first substrate or within said at least one hole extending through said second substrate.

16. The method of claim 15, wherein removing any excess fastener material comprises:
    introducing a magnet in close proximity to said integrated part to recover any excess fastener material not contained within said at least one hole extending through said first substrate or within said at least one hole extending through said second substrate.

17. The method of claim 15, wherein removing any excess fastener material comprises:
    introducing a heater in close proximity to said integrated part to melt any excess fastener material not contained within said at least one hole extending through said first substrate or within said at least one hole extending through said second substrate; and
    introducing a magnet in close proximity to said melted excess fastener material to recover said melted excess fastener material.

18. The method of claim 11, wherein said molded base includes at least one depression respectively coupled to a corresponding one of said at least one hole in said second substrate, each of said at least one depression being used to collect any excess molten fastener material drawn through said respective one of said at least one hole in said second substrate.

19. The method of claim 11, wherein the composition of said first substrate is different than said second substrate.

20. A method comprising:
    providing a first substrate having at least one hole extending through said first substrate;
    providing a second substrate;
    aligning said first substrate with respect to said second substrate;
    drawing a molten solder composition comprising magnetic particle through said at least one hole extending through said first substrate using a magnetic field; and
    cooling said molten solder composition to a solid mass position to join said first substrate and said second substrate together.

* * * * *